(12) United States Patent
Wieczorek

(10) Patent No.: US 8,662,975 B1
(45) Date of Patent: Mar. 4, 2014

(54) MULTIPLAYER GAME USING MULTIPLAYER CHARACTERS

(76) Inventor: Mark D. Wieczorek, San Diego, CA (US)

( * ) Notice: Subject to any disclaimer, the term of this patent is extended or adjusted under 35 U.S.C. 154(b) by 1258 days.

(21) Appl. No.: 12/508,394

(22) Filed: Jul. 23, 2009

Related U.S. Application Data

(60) Provisional application No. 61/083,022, filed on Jul. 23, 2008.

(51) Int. Cl.
*A63F 9/24* (2006.01)

(52) U.S. Cl.
USPC .......................................................... 463/9

(58) Field of Classification Search
USPC .......................................................... 463/9
See application file for complete search history.

(56) References Cited

U.S. PATENT DOCUMENTS

| | | | | |
|---|---|---|---|---|
| 3,902,723 A | * | 9/1975 | Colling et al. | 273/237 |
| 6,206,783 B1 | * | 3/2001 | Yamamoto et al. | 463/36 |
| 6,460,852 B1 | * | 10/2002 | Tallian | 273/243 |
| 7,794,315 B2 | * | 9/2010 | Sakaguchi et al. | 463/9 |
| 2001/0021670 A1 | * | 9/2001 | Miyamoto et al. | 463/43 |
| 2007/0060343 A1 | * | 3/2007 | Sakaguchi et al. | 463/31 |
| 2008/0287175 A1 | * | 11/2008 | Kusuda et al. | 463/17 |
| 2012/0238357 A1 | * | 9/2012 | Yamamoto et al. | 463/29 |

OTHER PUBLICATIONS

Diablo II Wikipedia Article, http://en.wikipedia.org/wiki/Diablo_II.*
Diablo II Wiki article on Confuse, http://diablo2.diablowiki.net/Confuse.*

* cited by examiner

*Primary Examiner* — Corbett B Coburn
(74) *Attorney, Agent, or Firm* — Mark D. Wieczorek

(57) ABSTRACT

System and methods are provided for implementing game play in a video game. A plurality of characters are provided, and a character may be captured and controlled by a user for gameplay such as fighting, crafting, and the like. The capture and control is for a limited time, such as a predetermined time that is generally short compared to the overall game duration. After the predetermined time, the character is released and the user free to grab another character.

25 Claims, 4 Drawing Sheets

MULTIPLAYER GAME USING MULTIPLAYER CHARACTERS

CROSS-REFERENCE TO RELATED APPLICATIONS

This application claims the benefit of U.S. Provisional Patent Application Ser. No. 61/083,022, filed Jul. 23, 2008, entitled "MULTIPLAYER GAME USING MULTIPLE CHARACTERS", which is incorporated by reference herein in its entirety.

BACKGROUND

Prior massive multiplayer online games (MMOGs) generally include character controls such that the character is controlled and associated with a single user. A user may have more than one character, but a user is generally restricted to controlling just one character at a time. Some players get around this restriction by employing multiple computers or application instances at one time, termed "multi-boxing", but such operation is burdensome and requires multiple accounts.

This Background should not be employed to determine or ascertain the scope of the claimed subject matter nor as limiting the claimed subject matter to implementations that solve any or all of the disadvantages or problems presented above.

SUMMARY

System and methods are disclosed for providing game play in a multiplayer game. A plurality of characters are provided, and a character may be captured and controlled by a user for gameplay such as fighting, crafting, and the like. The capture and control is for a limited time, e.g., for a predetermined time that is generally short compared to the overall game duration, but may be for any duration less than a total game time for a session. After the predetermined time, the character is released and the user is free to grab another character. In some implementations, the same character may be grabbed repeatedly. In some implementations, a user may grab multiple characters, such as a character and a pet, two complementary characters, such as a warrior and a healer, or other combinations as the user may desire.

This Summary should not be employed to identify key features or essential features of the claimed subject matter.

BRIEF DESCRIPTION OF THE FIGURES

Like reference numerals indicate like elements in the drawings. Elements are not drawn to scale unless otherwise indicated.

DETAILED DESCRIPTION

Figure 1:
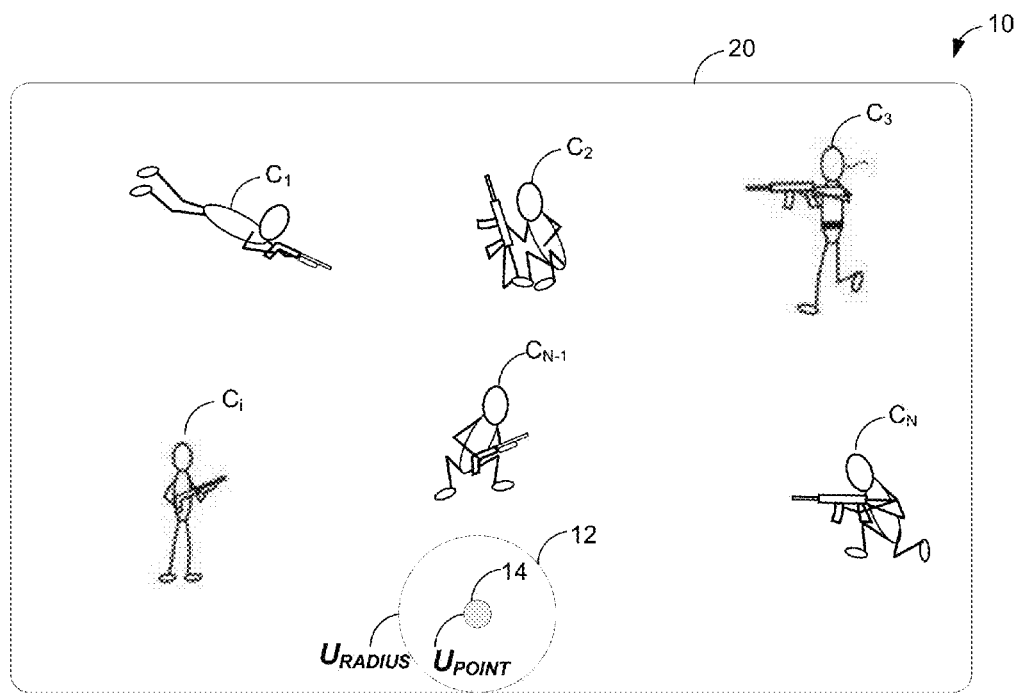
FIG. 1 illustrates a top-down view of a game environment, showing a number of player characters and non-player characters.

Referring to FIG. 1, a top-down view of a game environment 10 is seen. In some game systems, such a view is one that may be seen by the user. In other game systems, the view seen by a user is that of FIG. 2, which is in a first-person "shooter" perspective. In either case, a number of characters are shown: $C_1$-$C_N$. These characters may be player characters or non-player characters. Player characters are characters that are controlled by a user. Non-player characters are generally characters that are controlled by a game server. In one implementation, as will be described, player characters are converted into non-player characters and vice-versa. Non-player characters may be thought of as "temporary" player characters when the same have been captured by a user.

In the game system, characters move about in the game environment. Player characters move under control of a user; non-player characters move under control of the system. Each user is associated with a user location point (ULP) $U_{POINT}$ 14, and non-player characters that come within a user radius (UR) $U_{RADIUS}$ 12 of the user location point are "captured" or "grabbed" by the user, i.e., under the control of the user, associated with that $U_{POINT}$, for a predetermined time. During the predetermined time, the user can operate that non-player character as if the same were a player character controlled by the user, and can further accumulate points according to the actions performed by the user and player character, these points being displayed in a score box 18. Once the user has controlled the character for a predetermined time, the character may be automatically released back into the game environment. In some cases, the character may be killed while under control of the user, and in this case the character may be permanently removed from the game (for that session) or may be "resurrected" by a suitable technique, e.g., performing a task, paying a cost, or the like.

Figure 3:
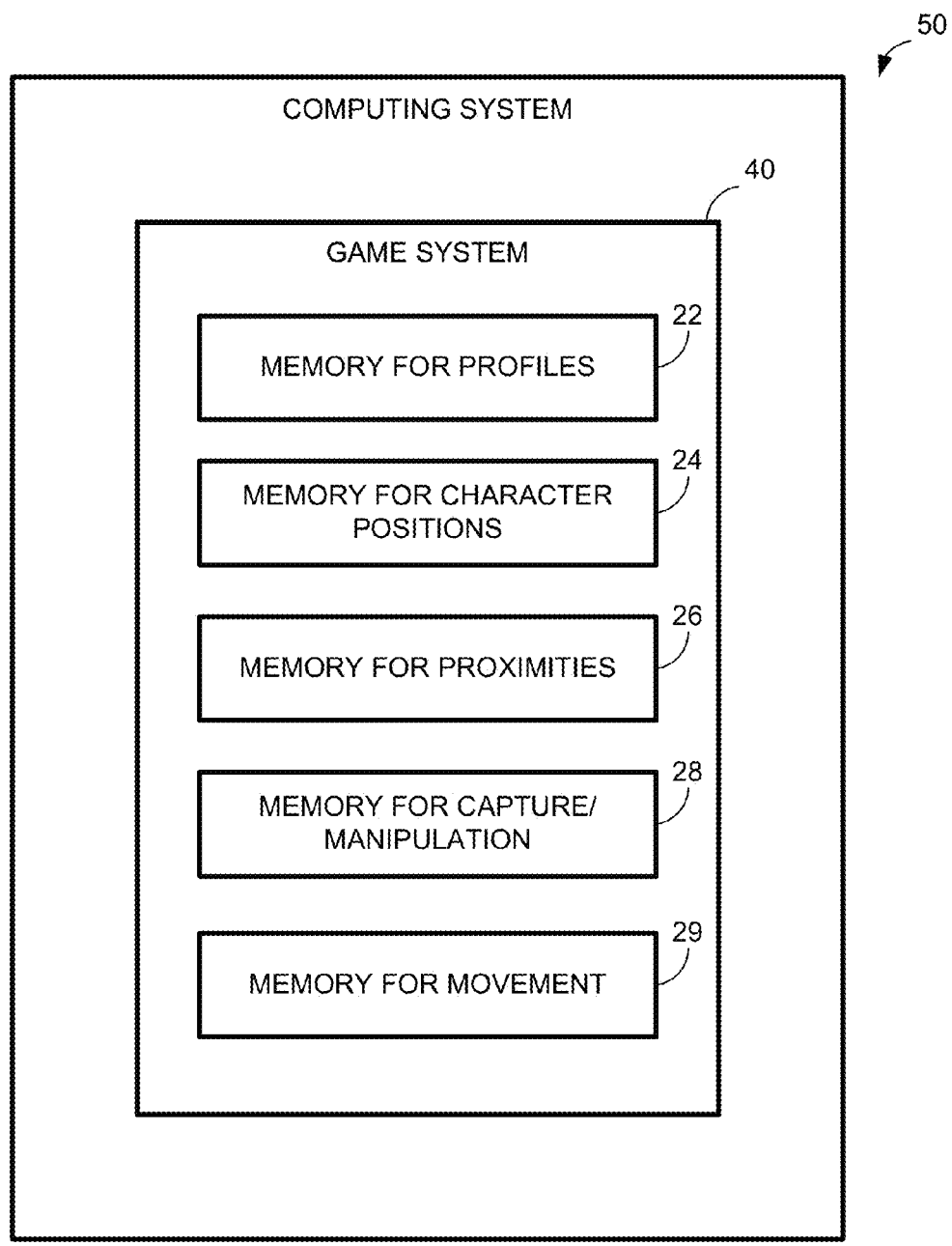
FIG. 3 illustrates a computing system including a game system in which the system and method may be implemented, illustrating various memory components that may store information about the game system.

FIG. 3 illustrates a computing system 50 including a game system 40 in which the system and method may be implemented, illustrating various memory components that may store information about the game system. A profile memory 22 stores information about characters, both player characters and non-player characters. A position memory 24 stores information about character positions, both player characters and non-player characters, in particular with regard to the user location point. The position memory 24 or a proximity memory 26, or both, may also store information about the locations of other players' user location points. The proximity memory 26 may be particularly employed to calculate distances of non-player characters or player characters from user location points. In the case where an non-player character is within a predetermined threshold distance from a user location point, a player may capture the non-player character for use as described, and aspects of this capture may be stored in a memory for capture and manipulation 28. A movement memory 29 may be employed to store data and information about a current location of the user location point, as well as data concerning its movement from one place to another as dictated by user input.

Figure 2:
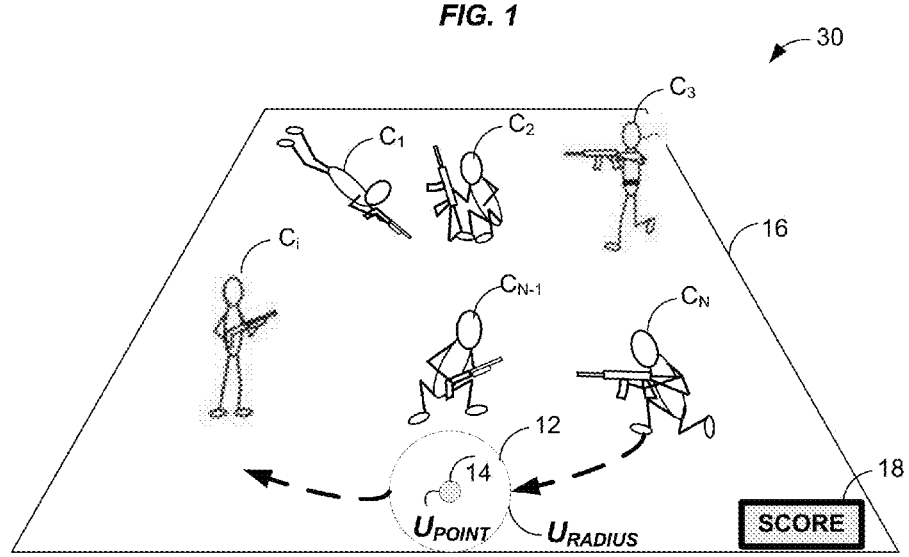
FIG. 2 illustrates a perspective view of a game environment, showing the view seen in a first-person "shooter" view.
Figure 4:
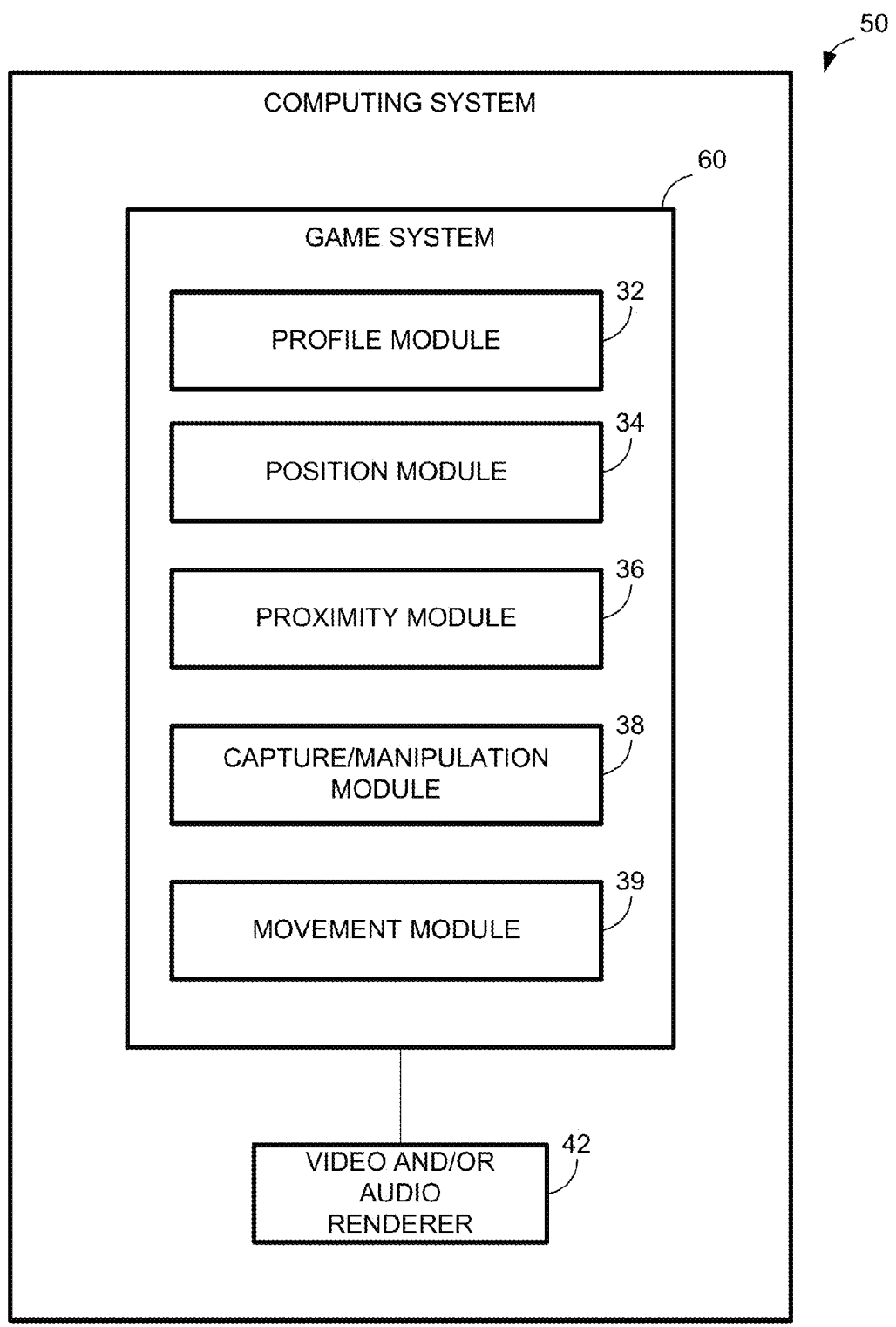
FIG. 4 illustrates a computing system including a game system in which the system and method may be implemented, illustrating various modular components that may carry out the game system and method, as well as a video and/or audio renderer for rendering indications of game elements as in FIGS. 1 and 2.

FIG. 4 illustrates the computing system 50 including a game system 60 from another aspect; in this case, various modular components are shown that may carry out the game system and method, as well as a video and/or audio renderer for rendering indications of game elements as in FIGS. 1 and 2, including player characters, non-player characters, user location points, predetermined user radii, and the like. In a similar as way to the above, a profile module 32 may include a routine that handles information about characters, both player characters and non-player characters. A position module 34 may handle information about character positions, both player characters and non-player characters, in particular with regard to the user location point. The position module 34 or a proximity module 36 may also handle information about the locations of other players' user location points. The proximity module 36 may be particularly employed to handle the calculation of distances of non-player characters from user location points. In the case where an non-player character is within a predetermined threshold distance from a user location point, a player may capture that non-player character for use as described, and aspects of this capture may be handled by a module for capture and manipulation 38. A movement module 39 may be employed to handle the movement of the user location point, as dictated by user input.

A video renderer and/or audio renderer 42 may be employed to render an indication of the results of any of the above modules, and the rendered signals may be sent to a video or audio device for playback.

Figure 5:
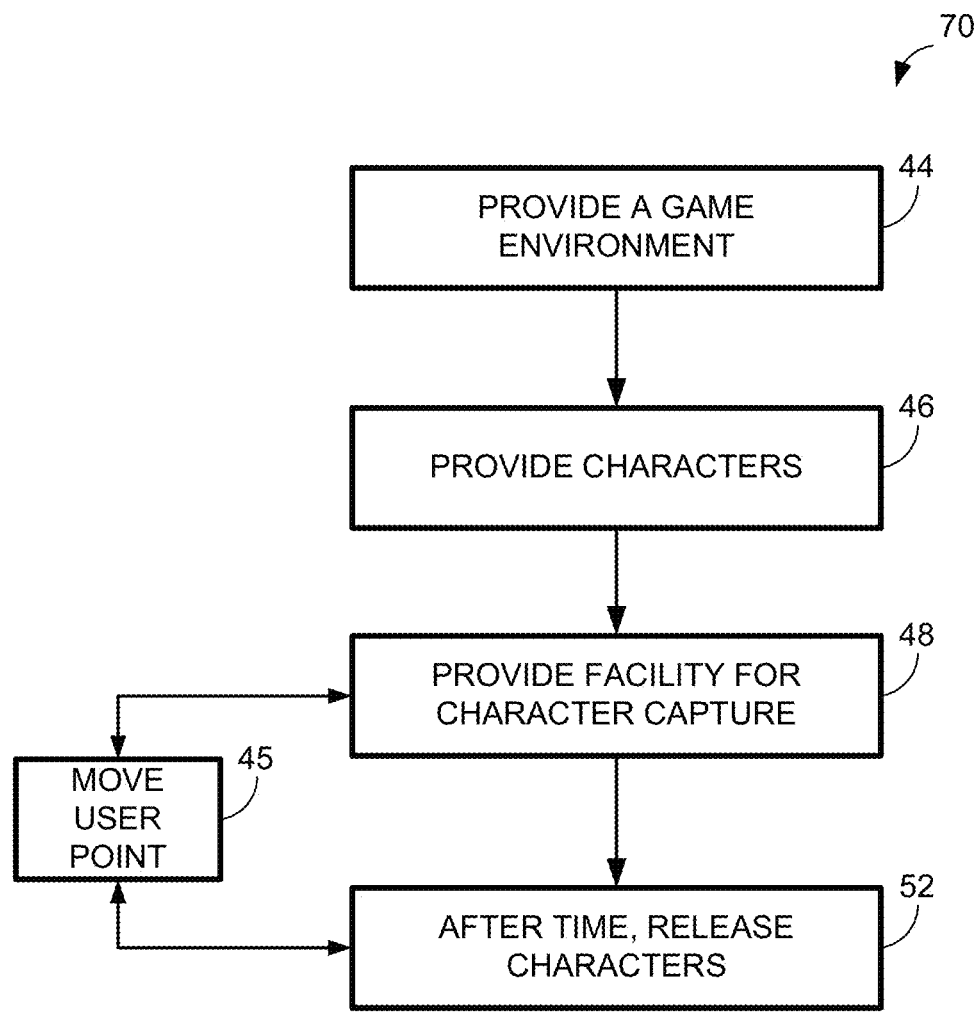
FIG. 5 is a flowchart of a method of an implementation of the invention.

FIG. 5 is a flowchart of a method 70 of an implementation of the invention. A first step is to provide a game environment (step 44). This may include providing a multiplayer environment in which various characters can exist, move, fight, or the like. A next step is to provide various characters which can be manipulated by players (step 46). A next step is to provide a facility whereby characters may be captured for use by players. For example, this may include provision of the user location points and user radii noted above. A final step is to, after a predetermined time, release the character from control of the player (step 52). This may be accomplished by employing a countdown timer or other such system. The predetermined time may depend on many other factors as well, as described below. The user location point may be moved at any time (step 45), though in many implementations it may be configured to not move while a character is being controlled by a user.

While certain variations will be apparent in the above, certain implementation-specific variations are now discussed.

The user radius $U_{RADIUS}$ may vary. In some implementations, the size of the radius may vary so that lesser-skilled users are provided with a larger radius. Such may provide a measure of handicapping. In other implementations, the size of the radius may be made larger as a user's score increases, thus providing an incentive for players to increase their skills. In yet other implementations, the size of the radius may be made smaller as a user's score increases, this further providing a level of equalization among players of different skill. The user radius may also be temporarily increased or decreased, in some implementations, by invoking a special power or attribute or if the player or character has performed in a negative fashion, respectively.

When a character is under control of a user, the character may be moved in a normal fashion, including running, walking, flying, transporting, or moving in any other manner. A user location point $U_{POINT}$ may also be made to move, but the same may move slowly so as to inhibit the ability of a user to race after a desired player and "tie up" or occupy that player unduly. In other implementations, the user location point $U_{POINT}$ may be made to move quickly, and the ability to "grab" specific players may then be made a part of the gameplay. For example, the user location point may move generally with the grabbed character. After release, the user may "run" the user location point to the location of another non-player character, and may continue gameplay after capturing that non-player character.

Different classes of characters may be indicated by different shapes or colors or character portraiture—in this way, users can quickly tell the different characters apart. The same may further be employed to indicate different levels of classes. For example, all wizards may have a similar appearance, but lower-level wizards may have green coloring while higher-level wizards may have gold coloring. Clearly, given this teaching, numerous variations will be seen.

A user can operate a character for a predetermined time. The predetermined time may be constant for all users over the course of a game. In other implementations, the predetermined time may vary. For example, if a user is enjoying a particularly high degree of success with a character, that user may be allowed an extra amount of time with that character. In one implementation, the user may continue to control the character so long as their success continues, however the success is measured. In another implementation, if a given game lasts for a given period of time, the predetermined time during which a player has control of a character may increase during that given game time, may decrease during the given game time, or may follow any other function. A user may also expressly release control of a character.

A cost may be associated with a character. In this case, all players may start with a given amount of "money", and this money can be expended by grabbing and using characters. More powerful characters may cost additional funds. Accordingly, users may employ more powerful characters to accomplish certain tasks, but then relinquish them so as to not expend too many funds.

When a character is not under control of a user, then the same may act in the same manner as any other non-player character. In another implementation, un-captured characters may generally move in a relatively slow manner around the game environment, e.g., slow with respect to the speed at which a user may move a user location point. In this way, characters may be more easily grabbed or captured by users. In other implementations, the characters may move at any other speed, similar to other characters.

Crafting or trade skills may provide another route for users to increase their score. And certain characters may be particularly well-suited to crafting or trade skills. In this way, an incentive is provided for a user to occasionally give up a non-crafting character in favor of a crafting character. Crafting or trade skills may be employed to make food, armor, leathergoods, weapons, or the like. Because characters shift from user to user, the employment of crafting or trade skills primarily results in score increases to a user. However, in some implementations, goods made by a character may be utilized by the next character controlled by the user. In other implementations, the goods may be stored by the user for utilization by one or more future characters controlled by the user (i.e., not necessarily the next character controlled by the user), at a timing of the discretion of the user. Such goods may be stored in an inventory controlled by the user which may be accessed for use with multiple characters. The inventory may similarly hold skills, money, and the like, in addition to items collected or purchased.

Users may be motivated to switch characters in several ways, besides the ones noted above. For example, a user may be provided, e.g., with a given amount of health and a given amount of, e.g., mana, for use with characters. Control of a warrior character may deplete health, if fighting, and control of a magical character (one that casts spells) may deplete mana. Variations will be seen given this teaching. Generally speaking, a user may be motivated to switch from one type of character to another to utilize a different type of asset. The balance between one type of asset and another may be set by users according to their playstyle. In other implementations, the system may further employ different types of asset allocations for different types of game environments. For example, some game environments may have 50/50 health/mana, others 25/75 health/mana, and the like.

Besides fighting and crafting, other non-player characters which may be grabbed include those able to provide food or repair functionality. A user may be able to store one or more particular items, e.g., weapons, that may be employed with any character controlled by that user, e.g., in the user inventory described above. This may be appropriate where the user has a particular special weapon that they enjoy using. If the weapon or other item requires repair, a user may capture a character who has an ability to perform such repairs.

Non-player characters may be considered as temporary player characters when they are captured by a player. Otherwise, they may act as regular non-player characters, fighting, protecting, expressing, or performing any other such actions under control of the system, e.g., the game server or environment.

The above are but a few examples—numerous variations and combinations of the above may be employed, and the above as well as variations may be employed in any combination. For example, once a character is released or otherwise has its control relinquished from a user, the character may be disposed adjacent its prior position or may be disposed in another part of the game environment entirely. In some implementations, following use, a character may be removed from the game entirely. In this way, the game moves naturally towards an endgame in which a fewer number of characters are available for control. In such implementations, users must strategize to take account of the removal of characters; certain characters may be "taken out" of the game early or may left in for use in the "endgame". In the same way, while the system and method have been described with respect to multiplayer games, single-player games, whether online or offline, may also employ multiple characters where the user plays one character at a time as described above.

The system and method may be particularly employed in tournaments, where in prior systems users were given a character with which to play for a duration of a match. By allocating arbitrary characters, a player's skill is tested in the tournament rather than just how well-equipped their personal character is. In systems according to those provided here, a player's skill may be particularly well-tested, since there is little or no dependence on a given character. Given such a system, a rating system may be employed, e.g., similar to that employed for chess players. The rating system may be calculated by comparing how players perform relative to each other, given a particular set of initial conditions, e.g., the number and quality of non-player characters and weaponry and spell casting ability in the game environment, the game duration, and the like. The rating system may be the basis for various handicapping techniques, including increase the size of the user radius.

While the above description has described with respect to specific examples, it is to be understood that the invention is much broader than the disclosed examples. For example, while the present invention has been disclosed in the context of multiplayer games, the same may be employed in single player or offline games, educational games and education environments, and the like.

Moreover, the present arrangement may be implemented in any number of computing systems, including laptop computers, desktop computers, tablet computers, handheld computers, personal digital assistants ("PDAs"), mobile phones, smart phones, game consoles, personal media players, handheld game devices, and the like.

And although the subject matter has been described in language specific to structural features and/or methodological acts, it is to be understood that the subject matter defined in the appended claims is not necessarily limited to the specific features or acts described above. Rather, the specific features and acts described above are disclosed as exemplary forms of implementing the claims.

The invention claimed is:

1. A system for implementing a multiplayer game, comprising:
   a. a computing system having a capability for executing programming to implement gameplay in a game environment;
   b. memory in communication with the computing system, the memory comprising a plurality of profiles associated with characters in the game environment, the profiles including information about the characters;
   c. memory in communication with the computing system, the memory comprising information associated with the position of a subject player character in the game environment;
   d. memory in communication with the computing system bearing computer-readable instructions capable of determining the proximity of a user location point in the game environment to the subject player character; and
   e. memory in communication with the computing system bearing computer-readable instructions capable of capturing and manipulating the subject player character if the proximity of the subject player character to the user location point is less than a user radius, the manipulating occurring for a time, 1 wherein the time is a function of the success of the captured character.

2. The system of claim 1, wherein the capture and manipulation memory contains instructions for releasing control of the character after the time.

3. The medium of claim 1, wherein the method further comprises receiving an input from a user to expressly release the captured character during the predetermined time.

4. The medium of claim 1, wherein the method further comprises performing crafting with the captured character during the predetermined time.

5. The medium of claim 1, wherein the method further comprises, once a captured character is released, disposing the character adjacent the user location point or at a location at which the character was captured, or removing the character from the game.

6. The medium of claim 1, wherein users are associated with ratings, and wherein the method further comprises basing a size of the user radius on the user rating.

7. A non-transitory computer-readable medium containing instructions which, when executed by one or more processors disposed in an electronic device, perform a method for operating a video game including multiple game characters, the method comprising the steps of:
   providing a game environment;
   providing an interface for a game character to be captured and manipulated by a user for a time, the game character being captured and manipulated when the game character is less than a predetermined radius from a user location point, wherein the time is a function of the success of the captured and manipulated character.

8. The medium of claim 7, wherein the method further comprises controlling a movement of the user location point upon input of the user.

9. The medium of claim 8, wherein the method is such that the user location point moves faster than a character moves.

10. The medium of claim 8, wherein the method is such that the user location point moves slower than a character moves.

11. The medium of claim 7, wherein the method further comprises controlling a size of the user radius.

12. The medium of claim 11, wherein the method further comprises reducing or increasing the size of the user radius if the user has a score that exceeds a predetermined threshold.

13. The medium of claim 7, wherein the method further comprises assessing a cost against a user whenever a character is captured.

14. The medium of claim 13, wherein the cost is determined at least in part by information in a character profile.

15. The medium of claim 7, wherein the method further comprises releasing the game character after the time.

16. The medium of claim 7, wherein the method further comprises rendering an indication of the captured game character.

17. The medium of claim 7, wherein the method further comprises moving the user location point along with the captured character.

18. A system for implementing a game, comprising:
   a. a profile module running on a processor for handling a plurality of profiles associated with characters in the game environment, the profiles including information about characters;
   b. a position module for handling information associated with the position of a subject player character in the game environment;
   c. a proximity module for determining the proximity of a user location point in the game environment to the subject player character; and
   d. a capture and manipulation module for capturing and manipulating the subject player character if the proximity of the subject player character to the user location point is less than a user radius, the manipulating occurring for a time, wherein the time is a function of the success of the captured character.

19. The system of claim 18, further comprising a movement module for moving the user location point upon input of a user.

20. The system of claim 18, wherein the capture and manipulation control module releases control of the character after the time.

21. The system of claim 18, wherein the capture and manipulation module controls the size of the user radius.

22. The system of claim 21, wherein the capture and manipulation module reduces or increases the size of the user radius if the user has a score that exceeds a predetermined threshold.

23. The system of claim 18, wherein the capture and manipulation module assesses a cost against a user whenever a character is captured.

24. The system of claim 23, wherein the cost is determined at least in part by information in the character profile.

25. The system of claim 18, further comprising a rendering module for rendering an indication of the captured character.

* * * * *